(12) United States Patent
Li

(10) Patent No.: US 11,454,511 B2
(45) Date of Patent: Sep. 27, 2022

(54) SYSTEMS AND METHODS FOR PRESENTING MAP AND CHANGING DIRECTION BASED ON POINTING DIRECTION

(71) Applicant: Chian Chiu Li, Fremont, CA (US)

(72) Inventor: Chian Chiu Li, Fremont, CA (US)

( * ) Notice: Subject to any disclaimer, the term of this patent is extended or adjusted under 35 U.S.C. 154(b) by 0 days.

(21) Appl. No.: 17/306,889

(22) Filed: May 3, 2021

(65) Prior Publication Data

US 2021/0270627 A1 Sep. 2, 2021

Related U.S. Application Data

(63) Continuation-in-part of application No. 16/718,179, filed on Dec. 17, 2019, now Pat. No. 11,037,332.

(51) Int. Cl.
*G09G 5/00* (2006.01)
*G01C 21/36* (2006.01)

(52) U.S. Cl.
CPC ......... *G01C 21/367* (2013.01); *G01C 21/362* (2013.01); *G01C 21/3632* (2013.01)

(58) Field of Classification Search
None
See application file for complete search history.

(56) References Cited

U.S. PATENT DOCUMENTS

| | | | |
|---|---|---|---|
| 2012/0014558 A1* | 1/2012 | Stafford | A63F 13/426 382/103 |
| 2013/0196293 A1* | 8/2013 | Wood | G09B 5/06 434/169 |
| 2014/0022242 A1* | 1/2014 | Wenzel | H04N 13/398 345/419 |
| 2014/0210703 A1* | 7/2014 | Narasimhan | G06F 21/36 345/156 |
| 2014/0371954 A1 | 12/2014 | Lee et al. | |
| 2017/0330539 A1* | 11/2017 | Little | G10H 1/386 |
| 2018/0104573 A1* | 4/2018 | Jeffery | A63F 13/812 |
| 2018/0241936 A1 | 8/2018 | Li et al. | |
| 2019/0227628 A1* | 7/2019 | Rand | G06F 3/016 |

\* cited by examiner

*Primary Examiner* — Anh-Tuan V Nguyen

(57) ABSTRACT

Systems and methods for presenting a map and changing a direction of an object on screen. In an aspect, an elongated map segment is presented according to a device pointing direction. In another aspect, location-based information is sorted and presented according to a device pointing direction. In other aspects, a direction in which an object faces is changed according to a device pointing direction, and a direction of motion of an object is changed according to a device pointing direction.

20 Claims, 9 Drawing Sheets

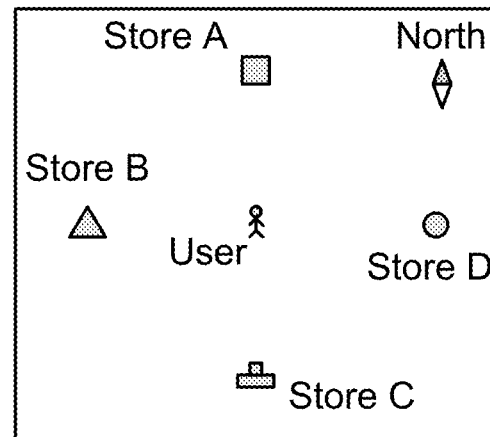
Original Map 24
FIG. 4-A
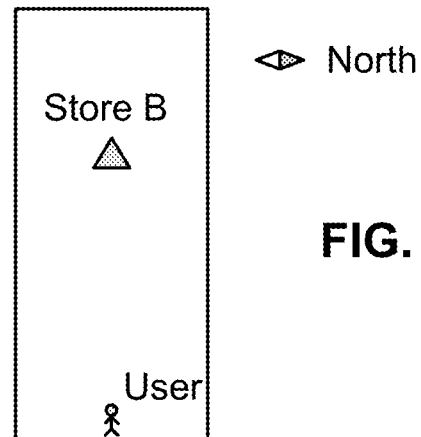
Map Segment 26
FIG. 4-B
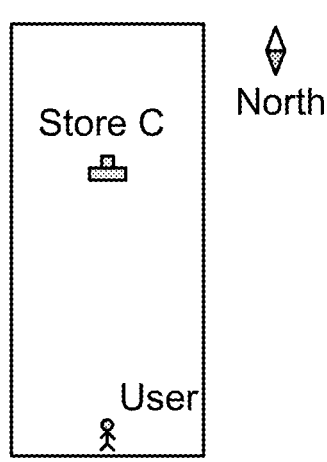
Map Segment 28
FIG. 4-C
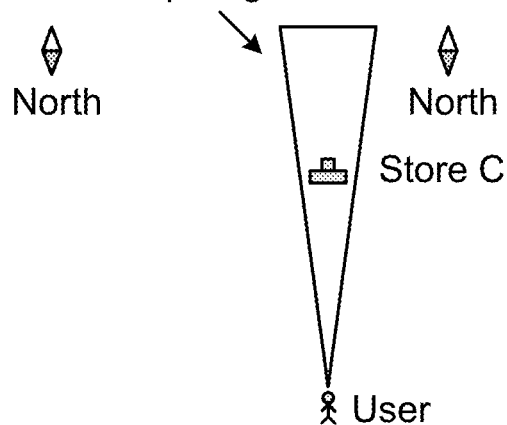
Map Segment 30
FIG. 4-D

Step 1. Point straight ahead
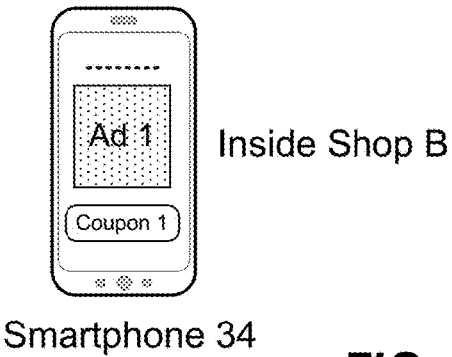
Inside Shop B
Smartphone 34
Step 2. After rotating
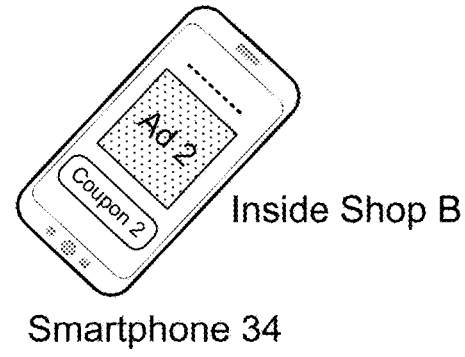
Inside Shop B
Smartphone 34
FIG. 6
Step 1. Start pointing mode
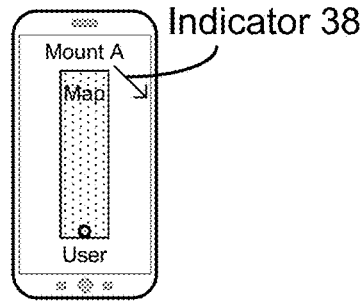
Indicator 38
Smartphone 36
Step 2. Rotate to find target
Mount A
Mount B
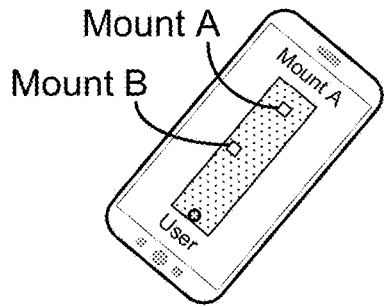
Smartphone 36
FIG. 7
Step 1. Start pointing mode
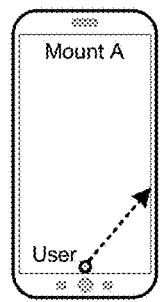
Smartphone 52
Step 2. Rotate to find target
Mount A
Mount B
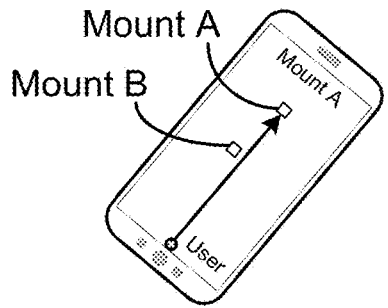
Smartphone 52
FIG. 8

Phone 44 lies in horizontal plane
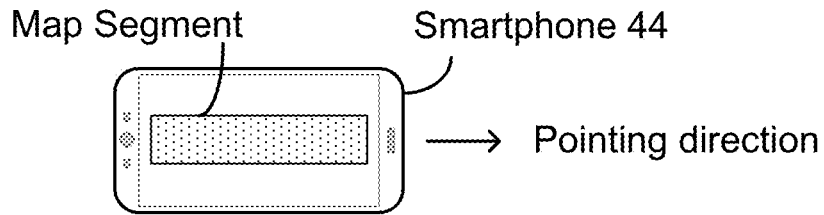
FIG. 11-A
Phone 44 perpendicular to horizontal plane
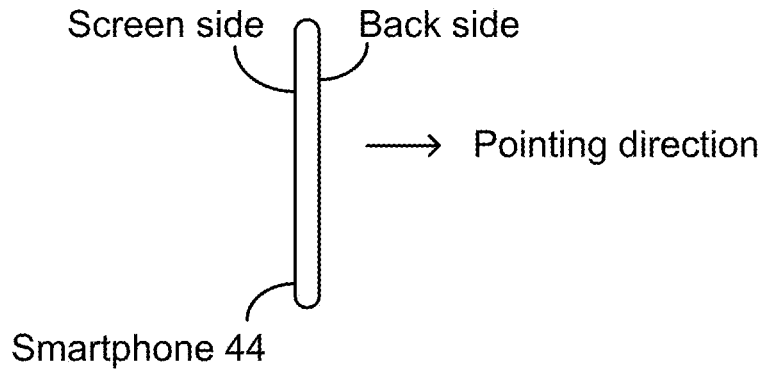
FIG. 11-B
Phone 50 perpendicular to horizontal plane
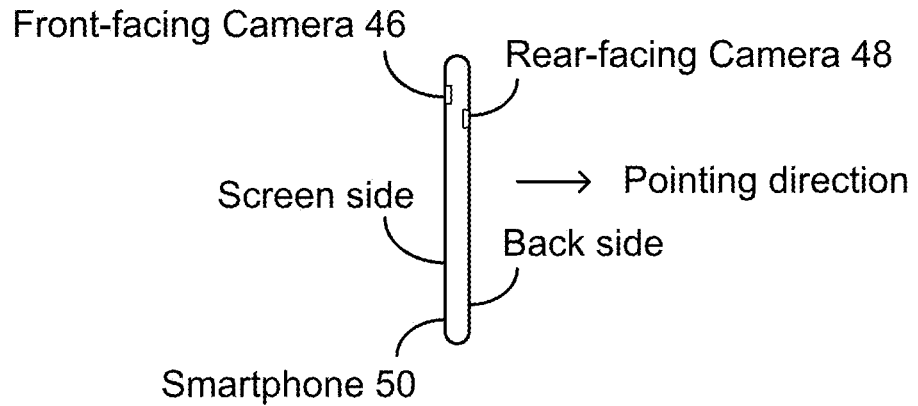
FIG. 12

SYSTEMS AND METHODS FOR PRESENTING MAP AND CHANGING DIRECTION BASED ON POINTING DIRECTION

CROSS REFERENCE TO RELATED APPLICATION

This is a continuation-in-part of U.S. patent application Ser. No. 16/718,179, filed Dec. 17, 2019, which is a continuation-in-part of U.S. patent application Ser. No. 14/918,572, filed Oct. 21, 2015.

BACKGROUND

Field of Invention

This invention relates to presenting location-based information and changing a direction of an object, more particularly to presenting a map and changing a facing direction or direction of motion of an object based on device pointing direction.

Description of Prior Art

Map is a useful tool to find a place and a direction to a place. But for some people, it may be hard to view a map and get directional help, because a map displays a special image of the real world. The connection between the image and the real world may not be easily understood. For instance, a map may contain all places around a user, but it doesn't tell where a place is located outside the map. As portable electronic devices like smartphones become ubiquitous in daily life and the processing capability becomes more and more powerful, it is more convenient than before to get maps or electronic maps online. It is also much easier to edit a map constantly and present a modified map immediately after a device location changes. But the issue with map lingers. Certain people still feel overwhelmed by a map and can't get needed location info.

Therefore, there exists a need to create an easy-to-understand map format.

When users carry a smartphone, a smart watch, a smart band, or other gadgets, they can be reached easily and are potential targets for location-based information in many occasions. For instance, a store manager may like to send info to people present at the store, an event organizer may like to send info to visitors on site, and airport authority may like to send news to passengers at an airport. Moreover, it's technically straightforward to send location-based information, since devices on the scene are the obvious receivers.

Currently, location-based info is presented to users without specific selecting effort and without user involvement in a lot of cases. As a consequence, users may passively receive too much info and get bored or frustrated. For instance, advertisements may come from all business nearby; a store may try to promote lots of products at a time; and a user may have to spend time looking for needed info.

Therefore, there exists a need to sort out location-based information and to present information to users selectively.

The facing direction and direction of motion of an object on screen or in real life may be changed using buttons, a steering wheel, or a joystick at an electronic device. However, pushing buttons, turning a steering wheel, or shaking a joystick is not an intuitive way to control an object.

Therefore, there exists a need to control an object on screen or in real life in a simple and convenient manner.

Objects and Advantages

Accordingly, several main objects and advantages of the present invention are:

a). to provide an improved method and system to present a map and other location-based information;
    b). to provide such a method and system which make a map easy to understand and easy to use;
    c). to provide such a method and system which present information based on a location and pointing direction of a device;
    d). to provide such a method and system which enable a user to select presentation content by device pointing direction;
    e). to provide such a method and system which show a direction of a target using an elongated map segment;
    f). to provide such a method and system which show a direction of a target using a directional mark like an arrow on a map; and
    g). to provide such a method and system which change the facing direction or direction of motion of an object according to the change of device pointing direction.

Further objects and advantages will become apparent from a consideration of the drawings and ensuing description.

SUMMARY

In accordance with the present invention, methods and systems are proposed to present a modified map and selected location-related information. To make the direction of a target easy to know, an elongated map segment is created. An elongated map segment is cut from a map based on where a device points at. In addition, an arrow may be added on a map to show a target's direction. The arrow may go from a user location to a target location and show where a target is relative to a device pointing direction. Moreover, location-based information other than map may be sorted and presented based on a device pointing direction. A user may search for information by pointing a device to a target. A user may also change the facing direction or direction of motion of an object using the device pointing direction.

DRAWING FIGURES

FIGS. 4-A, 4-B, 4-C and 4-D use graphic diagrams to show embodiments of a map segment in accordance with the present invention.

Figure 5:
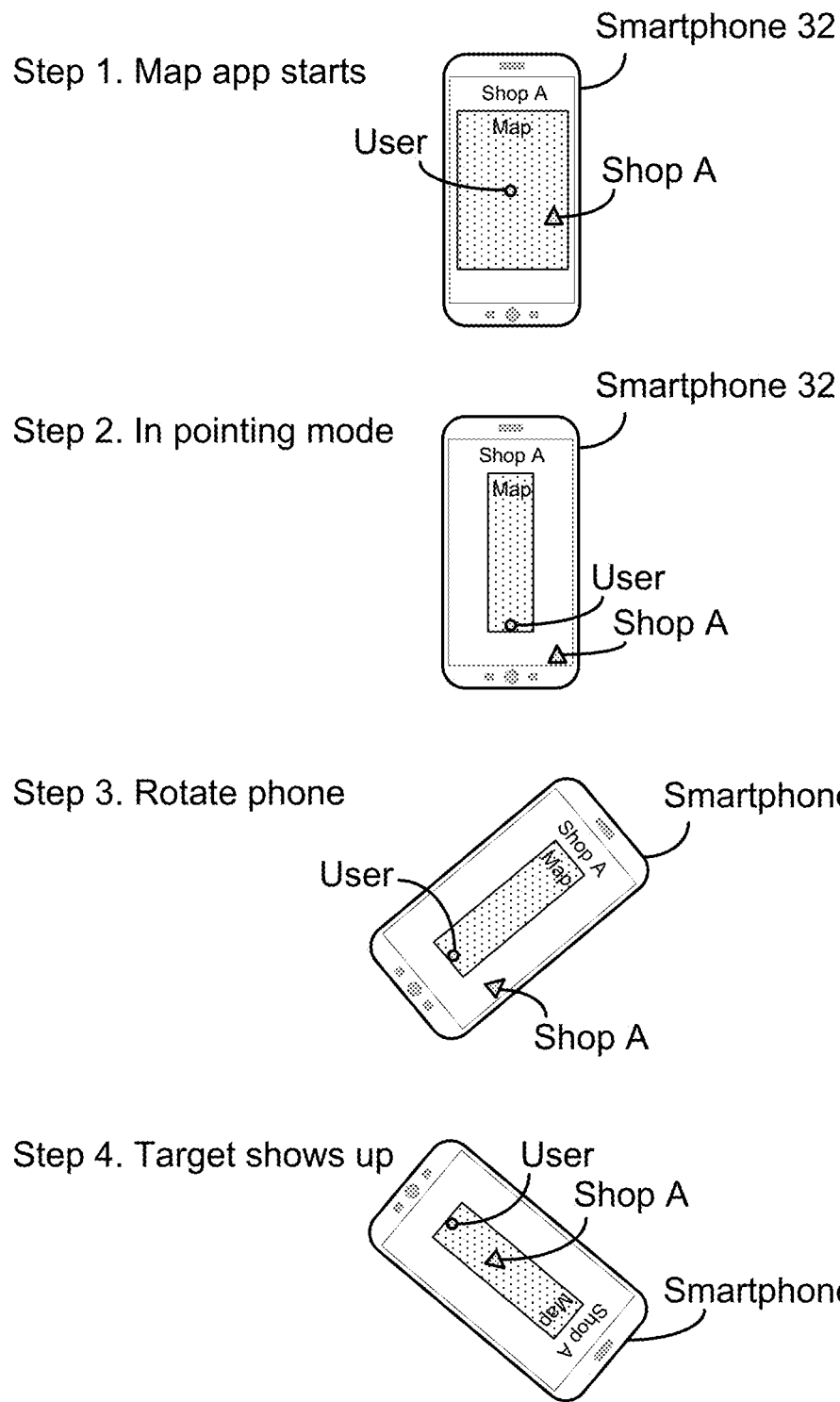

FIG. 5 employs graphic diagrams to show an embodiment of presenting a map segment in accordance with the present invention.

FIG. 6 shows schematically an embodiment of presenting information based on a pointing direction in accordance with the present invention.

FIG. 7 shows schematically an embodiment of presenting a map segment with an indicative symbol in accordance with the present invention.

Figure 9:
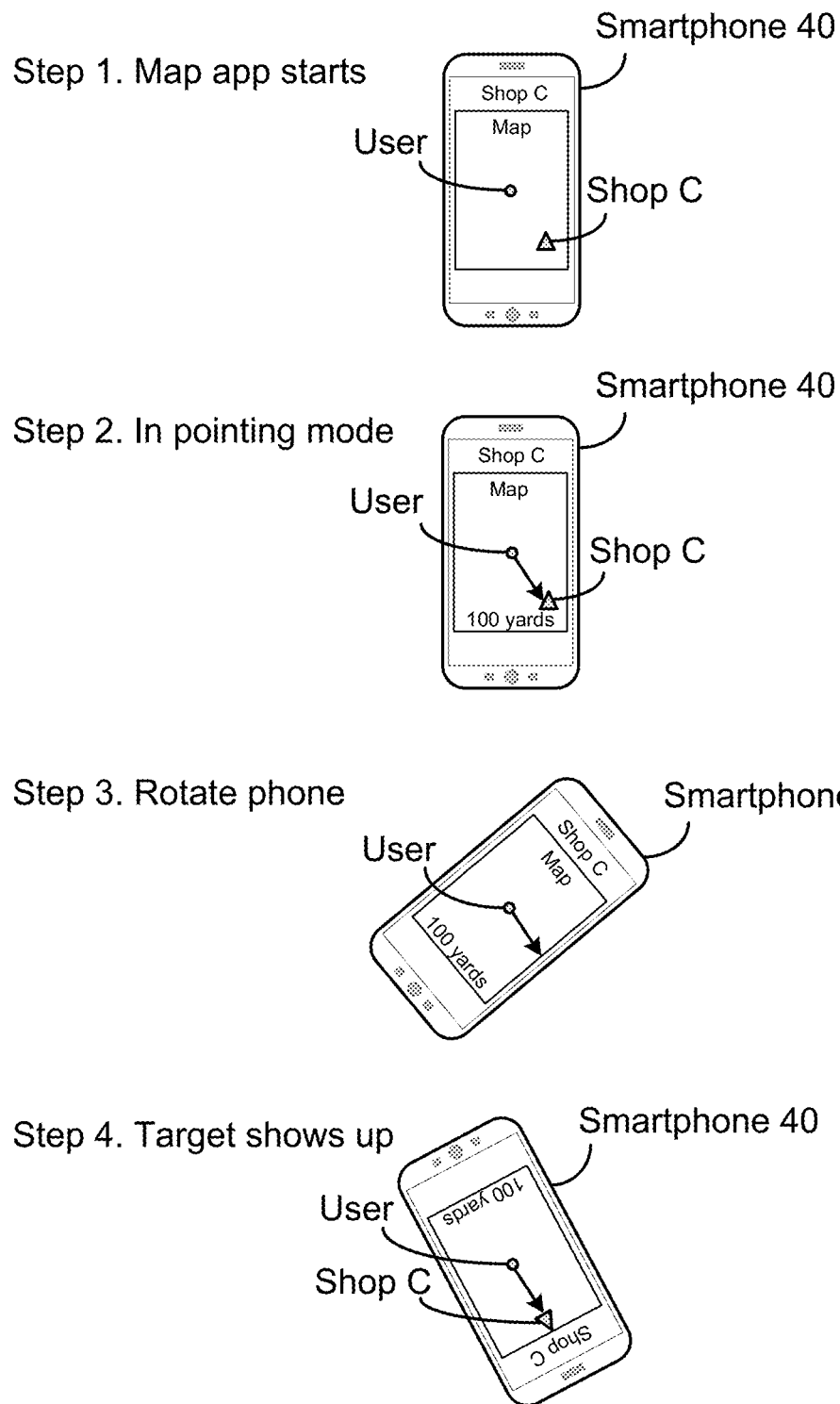

FIGS. 8 and 9 are graphic diagrams showing embodiments of map presentation with a directional arrow in accordance with the present invention.

Figure 10:
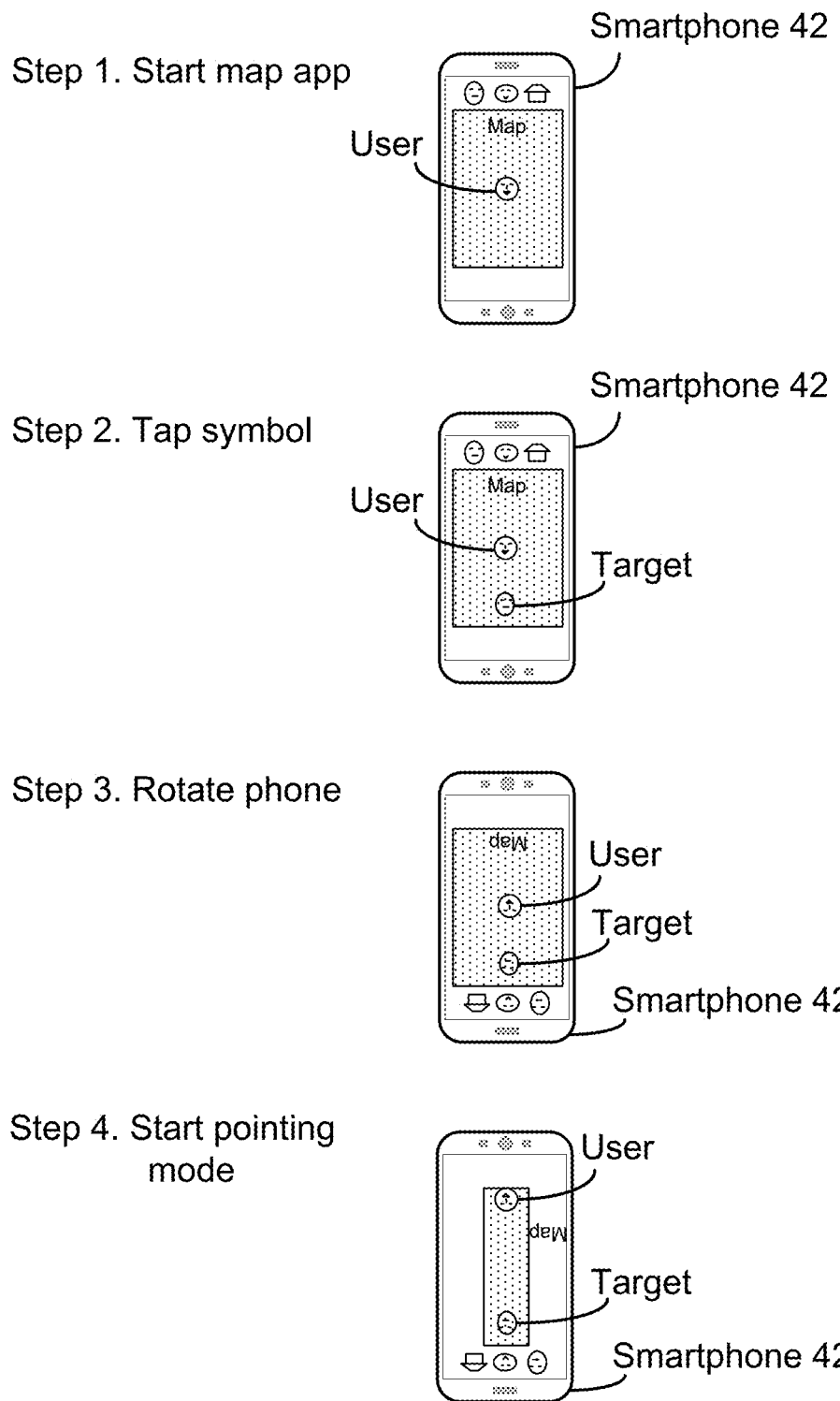

FIG. 10 shows schematically an embodiment of map presentation with target symbols in accordance with the present invention.

FIGS. 11-A, 11-B, and 12 are graphic diagrams illustrating a device pointing direction in accordance with the present invention.

Figure 13:
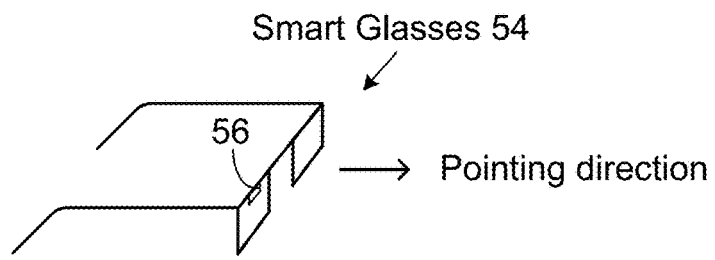

FIG. 13 is graphic diagram illustrating a device pointing direction in accordance with the present invention.

Figure 14:
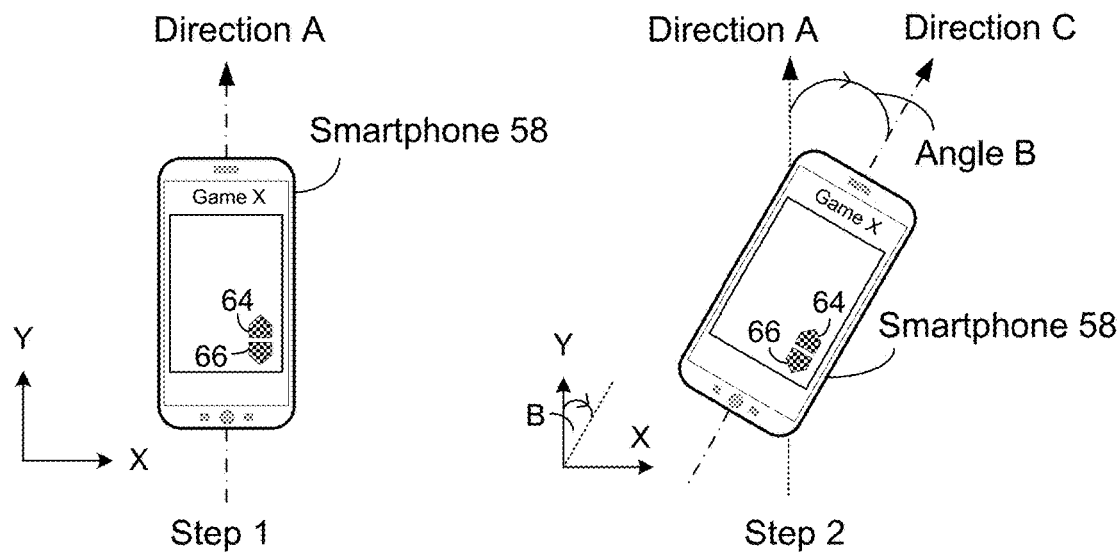

FIG. 14 shows graphic diagrams describing a change of device pointing direction in one embodiment in accordance with the present invention.

Figure 15:
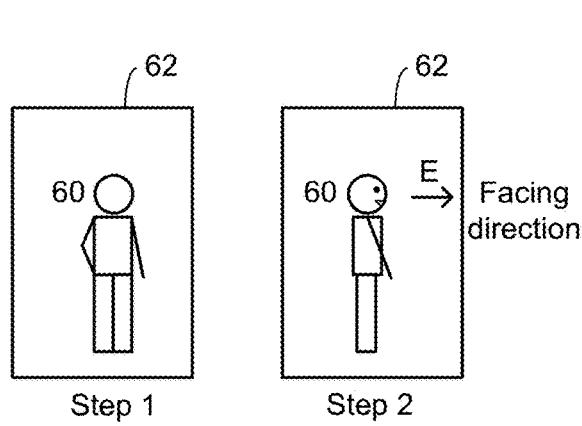

FIG. 15 shows graphic diagrams describing a change of facing direction in one embodiment in accordance with the present invention.

Figure 16:
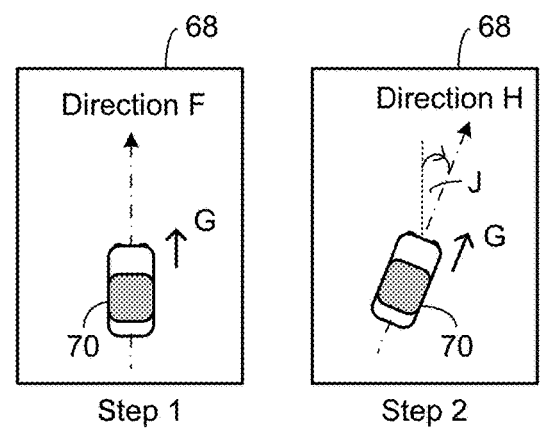

FIG. 16 shows graphic diagrams describing a change of direction of motion in one embodiment in accordance with the present invention.

| REFERENCE NUMERALS IN DRAWINGS | |
|---|---|
| 10 | Sensor |
| 12 | Device |
| 14 | Processor |
| 16 | Computer Readable Medium |
| 18 | Sensor |
| 20 | Sensor |
| 22 | Sensor |
| 24 | Map |
| 26 | Map Segment |
| 28 | Map Segment |
| 30 | Map Segment |
| 32 | Smartphone |
| 34 | Smartphone |
| 36 | Smartphone |
| 38 | Location Indicator |
| 40 | Smartphone |
| 42 | Smartphone |
| 44 | Smartphone |
| 46 | Camera |
| 48 | Camera |
| 50 | Smartphone |
| 52 | Smartphone |
| 54 | Smart Glasses |
| 56 | Display Device |
| 58 | Smartphone |
| 60 | Character |
| 62 | Screen |
| 64 | Button |
| 66 | Button |
| 68 | Screen |
| 70 | Vehicle |
| 100, 102, 104, 106, 108, 110, 112, 114, 116, 118, 120, 122, 124, and 126 are exemplary steps. | |

DETAILED DESCRIPTION

The following exemplary embodiments are provided for complete disclosure of the present invention and to fully inform the scope of the present invention to those skilled in the art, and the present invention is not limited to the schematic embodiments disclosed, but can be implemented in various types.

Figure 1:
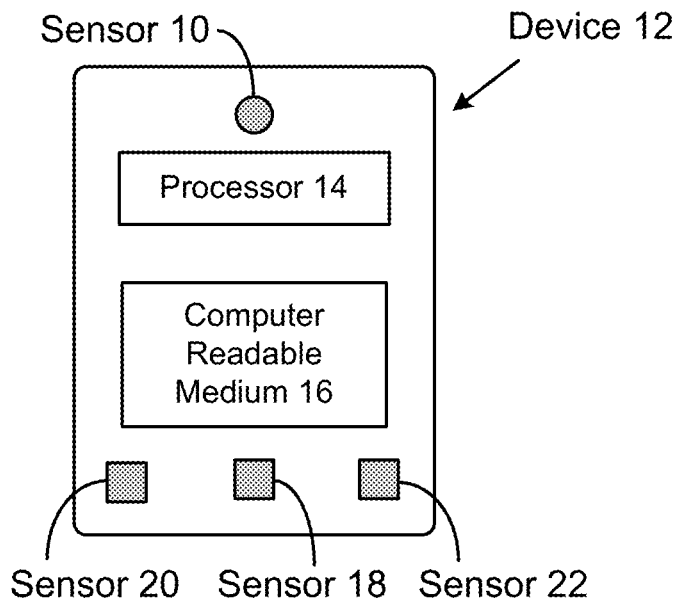
FIG. 1 is an exemplary block diagram describing one embodiment in accordance with the present invention.

FIG. 1 is an illustrative block diagram of one embodiment according to the present invention. A device 12 may represent an electronic device, including but not limited to a smart phone, a handheld computer, a tablet computer, a smart watch, a smart band, smart glasses, other wearable devices, and the like. Device 12 may include a processor 14 and computer readable medium 16. Processor 14 may mean one or more processor chips or systems. Medium 16 may include a memory hierarchy built by one or more memory chips or storage modules like RAM, ROM, FLASH, magnetic, optical and/or thermal storage devices. Processor 14 may run programs or sets of executable instructions stored in medium 16 for performing various functions and tasks, e.g., surfing on the Internet, playing video or music, gaming, electronic payment, social networking, sending and receiving emails, messages, files, and data, executing other applications, etc. Device 12 may also include input, output, and communication components, which may be individual modules or integrated with processor 14. The communication components may connect the device to another device or a communication network. Usually, Device 12 may have a display (not shown in FIG. 1) and a graphical user interface (GUI). A display may have liquid crystal display (LCD) screen, organic light emitting diode (OLED) screen (including active matrix OLED (AMOLED) screen), or LED screen. A screen surface may be sensitive to touches, i.e., sensitive to haptic and/or tactile contact with a user, especially in the case of smart phone, smart watch, tablet computer, and other gadgets. A touch screen may be used as a convenient tool for a user to enter input and interact with a system. Furthermore, device 12 may also have a microphone and a voice recognition component for receiving a verbal command or audible input from a user.

A communication network which device 12 may be connected to includes a range of entities such as the Internet or the World Wide Web, a local area network (LAN), a wide area network (WAN), a metropolitan area network (MAN), a telephone network, an intranet, wireless, and other types of networks. Device 12 may be connected to a network by various wired, wireless, optical, infrared, ultrasonic, or other communication means.

Device 12 may include a sensor 10 which tracks the eye movement or gazing direction of a user using mature eye-tracking or gaze detection technologies. The sensor may be arranged on a top surface of the device, or close to a display screen, and may have imaging capabilities. After taking a user's image, a system may recognize whether the user's eye is in such a position that the eye sight may fall on the body of device 12 using certain algorithm. In other words, sensor 10 may be employed to determine whether a user is looking at the body or a screen of a device. Once it senses that a user is gazing or looking at a given target, it may record the starting time, and then the total gazing or watching time. Only when a gazing or watching time exceeds certain value, for instance one or a few seconds, it may be considered that a user is gazing or looking at a target. So a very brief look may be too short to qualify as gazing or watching act. In the following sections, it is assumed the total watching time satisfies the minimum value requirement when it is said gazing is detected.

Sensor 10 may be built using mature imaging technologies, such as those that make camera modules for smartphones, and an image of a user's eye may be analyzed with algorithm to decide which direction the user is looking at. Both visible and infrared light may be employed for eye tracking. In the latter case, an infrared light source may be arranged to provide a probing beam. In addition, sensor 10 may also employ other suitable technologies which are capable and affordable other than the eye-analysis scheme illustrated to determine the gazing or watching direction of a user. In some embodiments, when the accuracy of gazing direction is not critical, such as when a gaze target is a screen or device, not a small area on a screen, a watching direction may be determined via analyzing facial pictures of a user.

Moreover, device 12 may contain a sensor 18 to detect its own movement by sensing acceleration, deceleration, and rotation, which may be measured by an accelerometer and a gyroscope. Accelerometers and gyroscopes are already mass produced using semiconductor technologies. They are widely used in smartphones and other personal gadgets. Using data obtained by an accelerometer and gyroscope of sensor 18, it may be determined whether device 12 is moved to the left, right, forward, or backwards, and at what speed, whether it is rotated clockwise or anticlockwise along which axis, and whether it is tilted to the left, right, forward, or backwards. The data may also be used to detect whether a device is moved back and forth as a result of shaking or is in other movement. In some embodiments in the following, device shaking is one state to be detected. Furthermore, sensor 18 may be used to detect vibration of device 12.

In addition, device 12 may carry a positioning sensor 20 and a magnetic sensor 22. Positioning sensor 20 may be a global positioning system (GPS), which enables a device to get its own location info. Device position may also be obtained using wireless triangulation methods, or via a system using other suitable technologies, while both may be performed by a service provider or service facility. Usually for indoor or some urban environment, positioning methods other than GPS are used, since GPS requires a clear view of the sky or clear line of sight for four GPS satellites. Sensor 22 measures the earth magnetic field along at least two orthogonal axes X and Y. It may work as electronic compass to determine device orientation, such as which direction a device points at. When a device's location is known, a service center may send to the device location-based information, e.g., maps or info related to the location or nearby places. In the case of location-based advertising, a user may receive ads and other info when he or she arrives at a business or comes close to a business. Furthermore, when a pointing direction of device is known, a map with certain shape may be created to help a user get the direction of a target. Moreover, a device's pointing direction may be used to send a user selected information related to that direction, or enable a user to use the pointing direction to search and obtain info interested.

In some cases, device 12 may include a gesture recognition mechanism. For example, images or videos captured by sensor 10 may be analyzed to obtain gesture commands from a user. The gesture commands may include certain acts of a user, such as a gesture and/or a movement of one or more fingers, a hand, an arm, the head, and/or the body.

Inside device 12, output signals of the sensors and detectors may be transmitted to processor 14, which, with certain algorithm, may process the data and produce subsequent command instructions according to certain given programs or applications. The instructions may include retrieving map data from a service facility and presenting a map or part of a map on a display.

Figure 2:
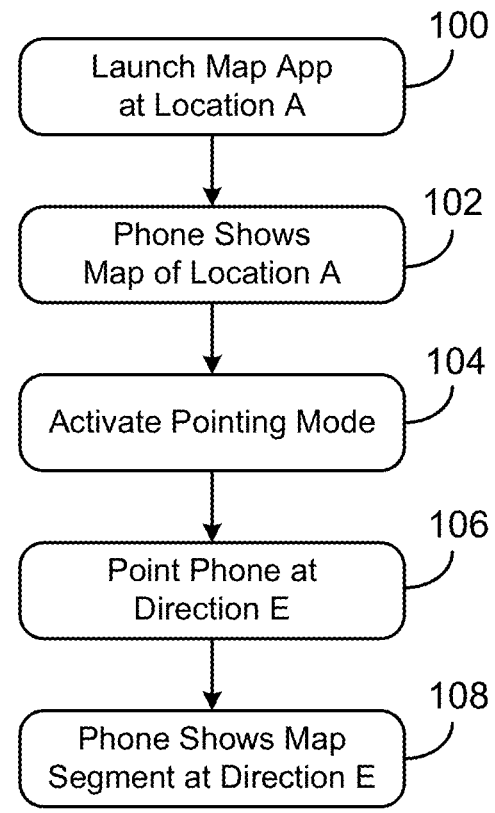
FIGS. 2 and 3 are exemplary flow diagrams showing embodiments of presenting a map segment along a device pointing direction in accordance with the present invention.

FIG. 2 is a schematic flow diagram showing one embodiment of presenting a map segment based on device pointing direction. Take a smartphone for example. Assume that a smartphone has a map application installed. The app is activated at Location A at Step 100 by a user. After that, a positioning sensor may start working to get its location. Once the location is known, certain location-based info such as map data may be transmitted to the phone from a service center via a communication network. Next an electronic map is presented on a phone screen at Step 102. The map may cover Location A and surrounding areas. Usually, Location A, the user's current position, is arranged at the center of the map. At Step 104, a pointing mode is turned on. The term "pointing mode" may mean an application and device state which make a device obtain orientation data besides location data and present a reconfigured map or a segmented map on a screen. Next an orientation sensor of the phone, like sensor 22 of FIG. 1, is switched on. Assume the phone is in a horizontal position, with a phone screen placed in a horizontal plane parallel to the ground. Then the phone's pointing direction is what its front end points at. A front end may be an end of phone which faces outward, while a back end or rear end may be the one which faces a user. For a phone in a vertical position, with a phone screen perpendicular to the ground, a pointing direction may be what its back points at or its rear-facing camera points at, which is the opposite direction of what its screen faces. Pointing direction is illustrated in more detail in descriptions below. In many cases, a device is assumed to be in a horizontal position. Back to FIG. 2. At Step 106, the user directs the phone to point at direction E, which is sensed by the orientation sensor. Then at Step 108, the phone displays a segment of the original map. The map segment may be arranged to show an elongated portion, covering a corresponding narrow area of the real world, i.e., a narrow area from the user's location to somewhere faraway along the pointing direction or direction E. As a segment is simpler than a whole map, it may be easier to use and comprehend. The elongated shape may also be used as a directional mark to show a direction of a target. More examples about the map segment are illustrated in descriptions below.

Figure 3:
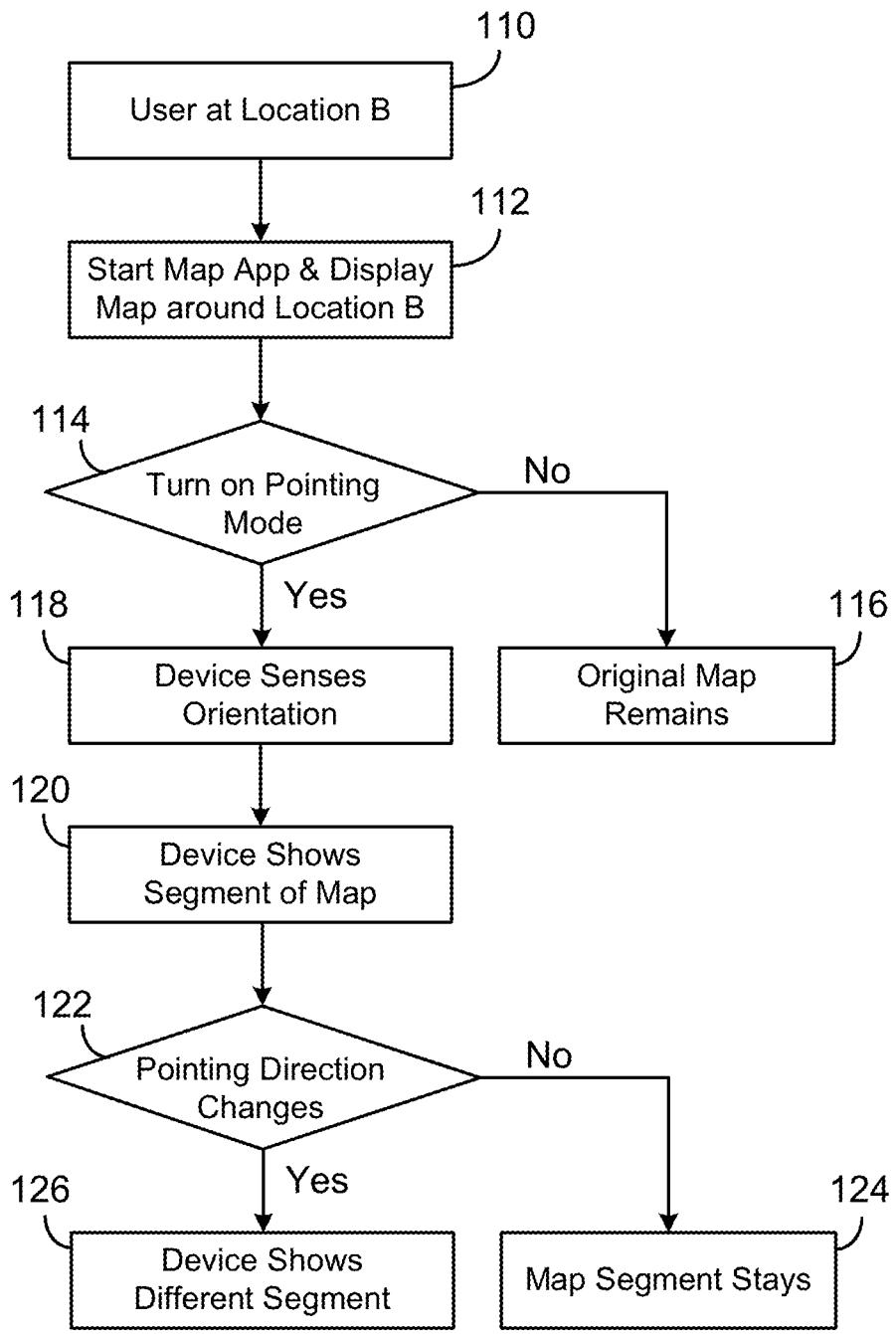

FIG. 3 shows another schematic flow diagram of presenting a map segment based on pointing direction. Assume a user carries an electronic device to Location B at Step 110. Next at Step 112, the user starts a map app. Consequently, Location B is identified by the device's own positioning sensor like GPS or by a service system. Soon the device display may show a regular map after obtaining related data from a remote service facility via a communication network. In a conventional manner, the map may contain areas surrounding Location B in all directions. If the user doesn't turn on pointing mode at Step 114, the display may keep showing the original map at Step 116. But if the pointing mode is switched on at Step 114, the device begins detecting its orientation at Step 118. After that, a device pointing direction is determined based upon location and orientation data. Then the map may be replaced by a map segment at Step 120. Like the embodiment with respect to FIG. 2, the map segment may be a sliced map portion, covering a narrow map area along a pointing line or a pointing direction. A pointing line may be a virtual line starting from the device location and extending along the pointing direction. At Step 122, the device orientation is measured again. If there is no change of pointing direction, the map segment on display may remain the same at Step 124. If there is any change of pointing direction, another segment of map is created around the new direction. Following that, the new map segment is presented at Step 126.

Besides a map, other location-based info may also be sorted, selected, and presented according to a device pointing direction. For instance, when a device points at a store, info, ads, and coupons of the store may be presented on the device. In addition, a user may use pointing direction as a selecting tool to get information he or she desires. Therefore, on the one hand, information may be sorted out by pointing direction and presented to a user by an advertiser in a more focused and more effective way. On the other hand, device pointing direction may be used by a user to select info or search for info.

As orientation data may be obtained fast through an electronic compass, pointing may lead to real-time info scanning. For example, when a user rotates a smartphone horizontally around a vertical axis, the phone may show info on places at consecutive directional angles, like scanning places using a probing beam. It may be designed that only qualified or registered entities within certain range, like one hundred yards or two miles, may show up on a map segment. A user may have options to add or delete entities on a to-show list, select a scanning range, or choose a category of presentation content. The scanning range may be set at any number, like shorter than a distance value, larger than a distance value, or between two values. Alternatively, it may be designed that during store/shop scanning, only information related to a business which a user faces directly in a pointing direction appears on screen. Thus a user may slowly rotate a device, e.g., a smartphone, to explore entities in front of him or her along each direction. A user may also point a device at a selected business nearby, which may be arranged to cause the device to display more info about that business, such as ads, a web site, and news, than a scanning result. Therefore, a user may rotate a device to scan surroundings for brief info, or point a device at a target for more detailed info.

FIGS. 4-A to 4-D are graphic diagrams which illustrate embodiments of presenting a map segment. Assume that the figures are what appear on a device screen respectively at different times. FIG. 4-A shows a conventional map 24 for the purpose of comparison. Like in a typical map, a user location is arranged at the map center. And there is a sign at the upper right corner showing direction of the North. There are four stores A, B, C, and D in four directions. Assume that device orientation data is known, and store locations are arranged on the map according to their location data. The device may point at Store A initially. As map 24 covers all surrounding places and all directions, a user may feel confused. For example, there is no sign on map which tells where a store is located in the real world.

FIGS. 4-B and 4-C illustrate schematically embodiments of segmented maps along different pointing directions. To make it simple and easy to view, and convenient to use, a map may be presented by a map segment, i.e., a cut off an original map. A map segment may be designed to be a slice of the original map, sliced along the device pointing direction, and representing a narrow area in the real world. Assume a pointing mode is turned on. As mentioned, the device points to Store A or the North at the beginning. After the device is rotated anticlockwise by ninety degrees around a vertical axis, the pointing direction changes to the West and Store B becomes located straight ahead. With pointing mode, the device may present a map segment 26 as shown in FIG. 4-B. In the new map presentation, only one store, Store B, is displayed since it's the only target in the pointing direction. The map segment is designed elongated along the pointing direction or the East-West direction as in the figure. In other words, a map segment may be designed to have a rectangular shape, where the length or height is larger than the width. The length or height value of a map segment is measured along a pointing direction, while the width value is measured along a transverse direction relative to the pointing direction. As a map area and map content are reduced, a map segment is simpler than a conventional map and causes less distraction to users. The reduction of map area and/or content may be arranged between fifty to ninety percent, or even more than ninety percent, depending on the segment width or a user's selection. In terms of size of data or file size, the reduction may be arranged at least fifty percent for map segment. For instance, size of data may be reduced by at least twenty megabytes, if the original size of data is forty megabytes. Narrowing of map width not only reduces map content and makes it simpler to view, but also creates a directional mark by the elongated shape itself. Additionally, as shown in the figure, a user's location may be arranged at the middle bottom area of the map segment. Thus a map segment only shows places or targets in front of a user, not behind him or her, which means the view in front of a user corresponds to the view of a map segment. As a result, the elongated shape may be utilized as a directional mark or sign, pointing to a target which may be located straight ahead, such as Store B in the figure. Thus a target's whereabouts may become easily recognized, because, it may be just straight ahead following the pointing line or pointing direction of a device. Therefore, a narrow map segment may serve as an easy-to-use helper for identifying the direction of a target. It may be designed that the width of a map segment is at most three quarters of the screen width of a device, which, along with the elongated feature, may make a map segment look like a pointing object, pointing to where a device points at. For convenience and flexibility, it may be designed that the segment width and width-length ratio may be adjusted by a user.

When the device is rotated to the opposite direction relative to the original one, a map segment 28 is exemplarily created in FIG. 4-C. The device points to the South now, and Store C is the only entity of interest on the map segment. Thus again, such map format has fewer unwanted content items. Again, it arranges a user location in the middle bottom region and preferably, a target location in the top portion of map. The elongated map segment may be used as a directional mark, pointing directly at Store C in the real world. A user may look at a map segment and then raise head, knowing a target is just ahead.

As a map segment is obtained by slicing a map along a pointing direction, some people may like other segment shapes. One example is depicted graphically in FIG. 4-D, where a segment 30 is presented. Segment 30 may represent a cut off a map along a radial direction which may be close to the pointing direction. In addition, it may be arranged such that the opening angle of the fan shape, which determines how wide a fan area spreads perpendicular to the radial direction, may be changed or adjusted by a user. Thus a user may widen a fan area or narrow it according to his or her need. Moreover, it may be designed that a user may have options to select a segment type or shape, like rectangular shape or fan shape. A user may also have options to edit or change a user location on a map segment.

As users may have different needs, it may be helpful if the shape of a map segment can be adjusted easily. For instance in FIG. 4-C, the elongated shape lies along the North-South direction. If the width along the East-West direction is adjustable, like making the segment shape more slender or wider, while the scale of map remains the same, it may fit certain needs. For instance, to tell the direction of a place, a narrow shape may work well. But sometimes a user may want to have a wide segment or wide view, if he or she wants to see more places on a map segment. If content items presented are not map image, but information like ads, coupons, and news, content types may also be arranged to be selectable or editable. For instance, it may be configured by a user to present coupons only, excluding other info prepared by advertisers at a location.

FIG. 5 describes a schematic scanning and searching process. Let a smartphone 32 represent a device in use for some embodiments. At Step 1, a map application is launched and phone 32 obtains related data to present a regular map. The data may include user location and device orientation info besides map content. Assume the target is Shop A. A user may enter the name so that Shop A's location shows up on the map. As other regular maps, the user's position may be placed at the center of the map and the map orientation may match the device orientation. Thus, the middle top part of the map may be where the phone points at or the user faces. But since the map doesn't give any intuitive indication of direction, the user may have to image where Shop A should be in his or her surrounding area and may consequently get frustrated by the uncertainty. Thus at Step 2, the user may switch on pointing mode. Next, the map is replaced by a map slice or map segment, where the user's position is configured at the middle bottom part of the map segment. The map segment is elongated along the device's pointing direction. As Shop A is not where phone 32 points at, its location is outside the map segment, but still on the screen. In order to make map segment cover Shop A, the user may rotate the phone clockwise by about forty-five degrees in a horizontal plane at Step 3. But Shop A is still outside the segment, since its location is not around this direction either. Then the user may continue rotating phone 32. At Step 4, phone 32 finally points at Shop A, which prompts the map segment showing the shop. Thus the user may finally be clear about Shop A's location, which is along the pointing direction or pointing line of phone 32.

Alternatively, the map application may provide another option, i.e., after the application is started, it automatically enters the pointing mode and shows a corresponding map segment, instead of a conventional map. Hence, two options may be provided for a user by a map application at a device such as phone 32 in some embodiments. If a regular mode is arranged, after the map application is launched, the map application displays a conventional map. If a pointing mode is arranged, after the map application is launched, the map application directly displays a map segment as aforementioned, instead of a conventional map. A user may choose one between the two options.

As each place may have its own unique content items prepared for potential users, location-based info may cover a wide range of subjects. In FIG. 6, location-based commercial and coupon are used as an example in an embodiment. Assume a user walks into Shop B with a smartphone 34. In order to find what is on sale and whether there are any coupons, the user may launch a pointing application. A pointing application may mean a map app where a pointing mode is switched on after the map app starts. First, user location and device orientation data is obtained via device sensors and/or a sensing system available in the store area. Then info provided by Shop B is transmitted to phone 34. At Step 1, the user may point the phone straight ahead. Assume that the phone points at a store section where ad 1 and coupon 1 are the designated content items. Next, ad 1 and coupon 1 are presented on phone 34. At Step 2, the user may rotate phone 34 to point at another store section. Then, ad 2 and coupon 2 may show up on screen, which represent promotion content items arranged for the new section.

Besides means for advertising, the pointing mode may also be designed as a product-finding tool inside a store. For instance, when a user points a device at a store section and taps "Product" button, products or product category in that section may be arranged to appear on screen. Such an object-finding function may be useful in a store, a park, a mall, a center, or other venues in both indoor and outdoor environments. Moreover, a user may use a keyword to look for a product inside a store like looking for the direction of a place as described above. For example, after a user enters a market, he or she may open a pointing app at a smartphone and key in a word to search a target product. Assume a map segment method is used. If a map segment shows the product, it may be located ahead and the user may just walk forward. If the map segment doesn't show the product, the user may rotate the phone around a vertical axis to look for it in other directions. If text and images other than map are used, the screen may be designed to tell a user whether a target is in the device's pointing direction, and optionally present a suggestion to find the target.

FIG. 6 provides a scheme for a user to find information about a target which is easily associated with a device pointing direction, because the target's location may be just ahead, or around where the device points at. It is noted that unlike presentation of a map segment, the focus is of providing select content, not a select map image. Select content may mean content reduction, since only certain information related to a pointing direction is chosen and presented. Content reduction may be measured by change of item quantity presented on screen or change in data size of files involved in on-screen presentation. A reduction of at least fifty percent may be arranged for effective improvement of viewing experience. For instance, if there are twenty entries or products prepared for a location, the number of entries or products shown on screen may be reduced by at least ten when a pointing mode is on. It may be designed that a user may choose what type or category of info to be presented. For instance, if a user only wants to get coupons and a list of products on sale when visiting a store, the user may check coupon and promotion boxes in a pointing program. Then other advertisement information may be filtered out and not be displayed.

FIG. 7 describes a schematic process to scan surrounding areas and find a target place. Assume a hiker wants to know where Mount A is on a hiking trail. At Step 1, he or she may activate a pointing app installed at a smartphone 36, which prompts a service facility to send data of an electronic map and other location-based info to the phone. The user may key in "Mount A" to start a search. Assume phone 36's screen lies in a horizontal plane and at the beginning, Mount A is not in the pointing direction. As the target is not shown on a map segment or even on screen, it may seem difficult to do a search. To facilitate a search act, a target indicator 38 may be arranged. The indicator, as an indicative directional sign, shows where a target might be or which direction a user shall rotate the phone to. So at Step 2, phone 36 is rotated according to the suggested direction. And then as shown in the figure, when phone 36 points to a specific direction, in which direction Mount A is located, the screen shows Mount A along with a nearby Mount B on a new map segment. With the map's elongated shape, it becomes clear where Mount A is. Additionally, the distance between user and target may be displayed on screen for reference (the distance is not shown in FIG. 7). In the search process, indicator 38 plays an important role. It gives user directional info and confidence. It may be configured that the map scale may change automatically to include a target place on screen. Even when a target appears on screen, indicator 38 may still help for some users, since it suggests which direction to turn to.

The scheme illustrated with respect to FIG. 7 introduces a simple and convenient way to align a map segment to a target and figure out the direction of a place, an event, a product, or any other entity. Events may include sports, entertainment, or other social activities, if their information is recorded at database of service center. A map segment may be easily related to a direction in real world, as it points along device pointing direction. In comparison, road signs and other physical directional signs presently used give an indirect and ambiguous signal, since these signs have to be understood first and then translated into a directional meaning.

The map segment method, especially the schemes described in FIGS. 5 and 7, may be useful for finding people, too. That is, the method of finding a person is similar to the method of finding a place. Assume person A is enrolled in a people-search program. After person A activates a pointing mode and logs in the people-search program at his or her device, the people-search program may send a message to a service center, and the service center may start verifying person A's eligibility to search for people. If person A is not eligible, the request is declined. If person A is eligible, the process proceeds. When person A wants to know where person B is, he or she may enter person B's name and search for person B like searching for a place or business using a map segment. The people-search program may send the info submitted by person A to the service center and receive location data of person B. The location data of person B then may be used to present person B's position to person A. Once an icon of person B appears in the middle part of a map segment, person B is at a place where person A's device points at. Then person A may follow the pointing direction to approach and finally meet with person B. Similarly, person B may also start a pointing app, sign in the people-search program, find person A's location on a map segment, and approach person A following device pointing direction. When persons A and B move toward each other, their locations change continuously. The service center may update location info and send users new data constantly. For privacy concerns, after person A submits person B's name for location search, the service center may ask for person B's permission first. If person B declines the search request, person A may not get any result about person B.

In addition, it may be configured that orientation data of one person's device may be shared by other person's device. Thus if person B faces what his or her device points at, person A may know the direction person B faces. An orientation-sharing program may be useful in some cases. For instance, parents may be able to tell their kid where to go when directing a kid to a place remotely. It may become especially useful when a person seeking directional help can't access or understand a map. It is noted that a device whose location and orientation are shared with another device may have sensors detecting or obtaining location and orientation data. But the device may not have or need a display. Certainly in daily life, it is more convenient to find each other if both parties can view the other party's location and orientation on screen. A target person's orientation may be presented on screen by a top view of a statue-like figure, for instance. The statue-like figure may rotate according to where a target person faces. Assume that a smartphone is placed with a display screen parallel to the ground and a user faces a direction that the phone's front end points at. Then, if the statue-like figure faces a user, the target person may face the user too. If the figure faces left, the target person may face left as well.

The process to display a target person's orientation info on a screen is similar to display a target person's location. After a user starts a people-search program at a device such as a smartphone, an interface of the people-search program shows up. The user may enter a name of a friend to search a location of the friend, or a location of a device of the friend. An interactive icon or checkbox with a name like "Orientation" may be configured in the interface. The people-search program monitors or detects any user act via the interface after the program is launched. If the program receives info that the "Orientation" icon is activated or the "Orientation" checkbox is checked, an orientation request is sent to a service facility along with other information such as a name of a target person which the user entered. After receiving the orientation request, the service facility starts collecting location and orientation information about the target person and then sends collected location and orientation information to the user. The program then displays the location and orientation info about the target person in the interface after obtaining it. For example, a map or map segment may appear in the interface, where a symbol such as a statue-like figure may be placed at a corresponding location. The statue-like figure, which may look like a person, may rotate to reflect detected orientation change. A direction which the statue-like figure faces is the direction the target person's device points at, which may be the direction the target person faces.

Moreover, communication functions may be added to pointing mode. When people are looking for each other, communication between them becomes helpful and highly desirable. For instance, a conversation button may be configured beside a map segment on a device. Assume persons C and D have started a pointing mode and signed in a people-search program to search for each other. Both may see the other's location on screen. When person C wants to talk, person C may press a conversation button, which may initiate a phone call or start walkie-talkie type communication. After person D picks up the call by pressing the conversation button on his or her device, they may speak to each other. In addition, a messaging button for sending instant messages may be arranged on a screen where a map segment is displayed. It is noted that when parties use smartphones to seek for each other, additional communication arrangement may sound extra. But the ability to talk or send message when viewing a map may bring convenience. Otherwise, a user may have to leave a pointing app interface, go to another interface to make a call or write a message, and then return to the pointing app interface to continue viewing the map, enduring unnecessary hassles.

FIG. 8 schematically shows another embodiment of presenting maps using device pointing direction. Assume that a smart phone 52 is used to find the direction and location of Mount A. At Step 1, arrow mode is turned on and Mount A as a target is entered. The term "arrow mode" may mean an application and device state which make a device obtain orientation data besides location data and present a map with a directional mark. After receiving location related data, the phone screen may show a map with a title "Mount A" on the top and the user position at the middle bottom part. As illustrated above, when a user holds phone 52 and faces the same direction as the phone points to, the view in front of him or her may correspond to the content of the map. Assume that Mount A is located somewhere outside of the screen. To give the user a sense of the general direction, an arrow with dotted line is arranged. The arrow, as a directional mark or sign, starts from a location of the user and points to a place where Mount A might be. It provides a helpful suggestion. A user may rotate phone 52 to point at a target by aligning the phone with the arrow. Next at Step 2, Mount A shows up on the map. The arrow ends there and the line becomes solid. Now Mount A is where both the phone and the arrow point at. Although an arrow may provide enough directional info on a target, the device pointing direction may give the user additional sense of the direction and assurance. It may make directional judgment easier, since the direction is where a device points at or a user faces. Besides an arrow, other directional mark or sign may also be used, such as a line or a pointing object which starts from a user and goes to a target.

Diagrams in FIG. 9 illustrate schematically another embodiment of map presentation using a pointing direction. Assume that a user is in a shopping mall and wants to find Shop C. The user may open a map application on a smartphone 40 and submit "Shop C" as the name of target. Next location and orientation data may be gathered by the phone and/or a service facility and map data may be sent to phone 40 via a communication network. At Step 1, a map may appear on phone 40, showing locations of the user and Shop C. Then at Step 2, the user may turn on an arrow mode. Resultantly, an arrow may show up starting from the user and ending at Shop C. In addition, the distance between user and Shop C may appear on screen as a useful reference. Presentation of the distance value between a user and a target may also apply to embodiments using a map segment, i.e., a device may be arranged to show a map segment and distance value together. For some people, the arrow in Step 2 may provide enough information to find the direction of Shop C. But for other people, the whereabouts of Shop C may still be elusive, as it is located behind a user who holds phone 40. Thus the user may rotate the phone at Step 3, and do it again in Step 4 until the phone points at what the arrow points at. Assume when a user rotates a device, his or her body moves along. Thus when phone 40 points at Shop C at Step 4, Shop C's location becomes clear, i.e., straight ahead. So the direction of Shop C is found, which is where phone 40 points at and the user faces. During above process, the distance info is arranged to stay at the bottom part.

It is noted that embodiments as shown in FIGS. 8 and 9 may be used to search for people as well. For instance, a user may enter a name of friend instead of Mount A or Shop C, and follow similar steps to find him or her. A people-search program may communicate with a service facility after being launched, obtain location data of a target person from the service facility, and then present for the user the location of the target person on a map or map segment. Since a target person may move and continuously change location, frequent update is needed to provide the right directional information on screen.

Diagrams in FIG. 10 describe another embodiment of map segment based on a pointing direction. Assume that a user starts a map app on a smartphone 42 at Step 1. When a map shows up, a location of the user, as often arranged, is at the center of the map. On a touch screen of phone 42, there are three symbols placed on the top portion, each representing a person or place, such as Dad, Mom, and home. As there are three persons involved, Dad, Mom, and the user, it is assumed that all three are registered in a location sharing program, and it is okay for them to know each other's location. Each person involved may have an on-screen symbol that may be a picture or an image which may be recognized or easily recognized by others. Assume that the user is the son among the three persons. Most often, a user enters a target name or code by keying in letters and numbers, which may be slow or inconvenient in some cases. For instance, a small child may easily identify a picture or symbol than memorize a word or name. So does a senior citizen. Besides, tapping a symbol is always faster than tapping a string of letters and numbers. Thus symbols, representing frequently searched person or place, may make map user friendly and easy to use.

At Step 2, the user may tap a symbol, for instance, Dad, which means a target for a search is entered. Then the map app sends the info inputted by the user to a service facility, obtains location data of the target person from the service facility, and presents the location on a map. Then an icon of the target person appears on the map. As the user's location and orientation are already known, it is determined that Dad is actually in a direction opposite what the user faces. Thus the user may turn around at Step 3. To narrow the search range, the user may start a pointing mode at Step 4. Then, a full map may be replaced by a map segment. The user's position on the map is moved to the middle bottom part of the map segment. The map segment confirms that Dad is straight ahead.

FIGS. 11-A and 11-B illustrate schematically a pointing direction of a smartphone in two situations. The principles may apply to other types of devices. In FIG. 11-A, a smartphone 44 is placed with a display screen parallel to the ground, i.e., a horizontal plane. As shown in the figure, a pointing direction may be defined as what the front end points at. When a map segment is shown on screen, its elongated shape lies along the device pointing direction. If a user holds the phone, raises head, and looks along the device's pointing direction, he may see what covered by the map segment. When an arrow is used as a directional mark, like what shown n FIGS. 8 and 9, the arrow may reflect a direction towards a target. When the arrow aligns with the device's pointing direction, a target may be in front of a user, or straight ahead. In many cases, it is assumed that a device screen is in a horizontal plane, like the example shown in FIG. 11-A.

In practice, a device may be held tilted relative to a horizontal plane. Thus, a device's pointing direction may contain three components relative to three orthogonal axes, X, Y, and Z. Arrange X and Y axes in a horizontal plane. Let X-axis point straight ahead, Y-axis point left, and Z-axis point upward vertically. When a device is tilted, tilting or rotating around X-axis and Y-axis may be detected and subsequently ignored. A device's orientation and pointing direction is measured by an angular value around Z-axis. In embodiments illustrated above, tilting phenomena are not mentioned since they don't affect the principle elaboration.

In FIG. 11-B, phone 44 is held vertically, with a screen plane perpendicular to the ground. Its pointing direction may be defined as what its back side points at, while the screen faces in the opposite direction or faces a user. In such configuration, a directional mark like a map segment or an arrow may not be aligned with the device's pointing direction. For instance, both a map segment and an arrow on screen may be in a vertical plane which is perpendicular to the device's pointing direction. Thus a user may have to take an upward direction as a horizontal direction when viewing a map. If the content items are of texts and pictures, not a map image, there is only one direction, the device's pointing direction, which matters. The direction mismatch issue no longer exists.

To determine which direction a device points at, both location and orientation info are required, since a pointing line starts from a device and goes along a pointing or orientation direction. In many cases, a GPS and an electronic compass may provide info needed. But in an indoor environment, GPS signals become unavailable and the magnetic field may be shielded or weakened by a building structure. Usually there are methods to substitute the GPS scheme, but orientation determination may become difficult to do. On the other hand, images of indoor setting may be stable, unaffected by weather and seasons, and may be acquired in advance. Thus another way to sense a pointing direction may combine positioning and imaging techniques. Assume a smartphone 50 has a front-facing camera 46 and rear-facing camera 48, as shown graphically in FIG. 12. Assume the phone is in a vertical position with phone screen perpendicular to the ground. In the figure, phone 50 points towards the right with back side and camera 48 facing right. After a pointing mode is on, phone 50's location is obtained. Meanwhile, camera 48 may be arranged to take one or multiple pictures of the scene in front of it. The pictures may be analyzed by a specific algorithm and compared with pictures taken previously at the place. Then another algorithm may be used to determine which direction the phone faces or points at, and a device pointing direction may be determined. The same method also applies to an outdoor setting, while pictures with different focusing distances for scenes nearby and faraway may be taken automatically for analysis. In both indoor and outdoor environments, front-facing camera 46 may be utilized to take pictures in the opposite direction simultaneously. The pictures may be analyzed similarly and may help get more accurate orientation results.

FIG. 13 illustrates schematically a pointing direction of smart glasses according to embodiments of the present invention. Smart glasses may include a virtual reality (VR) device, an augmented reality (AR) device, or another type of head-mounted display device. Referring to FIG. 13, smart glasses 54 may have a display device 56. Display device 56 may be a miniature display with a small screen or a miniature see-through display. In some embodiments, display device 56 may include a virtual screen. For example, display device 56 may have a light emitting device that projects an image on the retina of a user who wears smart glasses 54. As shown in FIG. 13, the pointing direction of smart glasses 54 corresponds to the forward direction of smart glasses 54. As such, after a user wears smart glasses 54, a place in from of the user is the place smart glasses 54 point at.

In the embodiments illustrated above, a user device (e.g., a smartphone) may be replaced by smart glasses 54. For a small display or virtual display of smart glasses, a small button or virtual button may not be configured for a user to tap. Thus, activation of a button displayed on a screen of smart glasses may be performed by other means instead of a tapping act. In some cases, a button displayed on smart glasses may be accessed and tapped by gestures. For example, smart glasses 54 may have one or more sensors to monitor gestures of a user and then interpret the gestures via a gesture recognition mechanism. Alternatively, a button displayed on smart glasses may also be activated by a voice command. A user may utter "product" to activate a "Product" button on screen to get product information. A user may also utter "pointing" to activate a "Pointing Mode" button on screen to start a pointing mode at the smart glasses.

FIG. 14 shows a change of pointing direction of an electronic device with graphic diagrams in an X-Y plane in accordance with the present invention. The X-Y plane is the horizontal plane and the Z-axis (not shown) is in the upward vertical direction. The electronic device may include a smartphone, a video game console, a controller device, etc. For descriptions with respect to FIG. 14, as an example, the electronic device is a smartphone 58. In some embodiments, two graphic objects such as buttons 64 and 66 may be presented on a screen of smartphone 58. Buttons 64 and 66 may have certain functions that will be described below. Optionally, buttons 64 and 66 may be physical buttons. For example, physical buttons working as buttons 64 and 66 may be configured on a surface of a game console or controller device. Smartphone 58 may include one or more accelerometers, one or more gyroscopes, and an electronic compass to detect the motion, location, and orientation of smartphone 58. Certain software such as a specific application or program may be installed at smartphone 58. After the specific application or program is started and in operation, the motion, location, and orientation are monitored continuously at smartphone 58. By detecting the status of the motion, location, and orientation, the pointing direction of smartphone 58 may be measured and obtained.

In some cases, the coordinate system with the X, Y, and Z axes may be fixed with respect to the background of smartphone 58. As such, any change of the orientation of smartphone 58 may be measured based on the coordinate system. Assume that a user launches the specific application and the pointing direction of smartphone 58 is monitored continuously by the specific application. At Step 1 as shown in FIG. 14, the screen of smartphone 58 is parallel to the X-Y plane and the pointing direction, direction A, is parallel to the Y axis. That is, the front end of smartphone 58 faces in the direction A. At Step 2, the user rotates smartphone 58 clockwise around the Z axis by an angle B and the pointing direction of smartphone 58 becomes direction C. As shown in FIG. 14, the coordinate system remains unchanged and smartphone rotates clockwise by angle B around the Z axis. The change of pointing direction may be detected by sensors and angle B may be measured and obtained by the specific program.

The change of device pointing direction may be used as a control method to change certain orientation or direction in a video game or virtual environment, or navigate a robot, a vehicle, a boat, or a flying object (e.g., an airplane or an unmanned aerial vehicle (UAV)). Directional control via device pointing direction may be more intuitive than using a steering wheel, a joystick, or a couple of buttons, and thus may provide ease and convenience for users.

FIGS. 15 and 16 illustrate schematically changes of direction of on-screen objects based on the change of device pointing direction. In the two figures, a character 60 is shown on a screen 62, while a moving object 70 is shown on a screen 68. Screens 62 and 68 may be physical screens or virtual screens. In some embodiments, screens 62 and 68 may be arranged on discrete display devices and controlled remotely by an electronic device. Alternatively, screen 62 or 68 may be integrated with an electronic device and controlled by the electronic device. When screen 62 or 68 is separated from and controlled remotely by an electronic device, screen 62 or 68 and the electronic device may be connected and communicate with each other wirelessly. They may be connected by Wi-Fi, Bluetooth, or other suitable communication technologies.

As shown in FIG. 15, character 60 stays at a location on screen 62 and faces in a direction into the page at Step 1. Assume that a coordinate system with X, Y, and Z axes (not shown) is configured and remains fixed with respect to the background of character 60. The X axis may point to the right side, the Y axis may point into the page, and the Z axis may point to the top of screen 62. Also assume that character 60 is a figure of a video game and screen 62 is a screen of a smartphone, e.g., smartphone 58 with respect to FIG. 14. A corresponding video game application is installed at smartphone 58. After a user opens the video game application, the movement, location, and orientation of smartphone 58 are monitored and detected continuously. A control system of smartphone 58 may collect movement, location, and orientation data using sensors and transmit the data to the video game application, since the video game application is in operation.

When it is detected that smartphone 58 rotates clockwise around the Z axis, the video game application makes character 60 rotate clockwise around the Z axis accordingly. Two turning modes may be provided. In the first turning mode, character 60 is turned by an angle that is determined by an angle that smartphone 58 turns. In the second turning mode, the facing direction of character 60 is determined by the pointing direction of smartphone 58 directly. For example, in response to that smartphone 58 is turned clockwise by angle B as shown in FIG. 14, character 60 turns clockwise around the Z axis on screen 62 by a turning angle that is based on angle B, which corresponds to the first turning mode. Alternatively, according to the second turning mode, after it is detected that the pointing direction of smartphone 58 is changed, the facing direction of character 60 is adjusted based on the pointing direction of smartphone 58. As the pointing direction of smartphone 58 forms angle B with the Y axis in the X-Y plane, the facing direction of character 60 forms an orientation angle based on angle B with the Y axis in the X-Y plane. The turning angle and orientation angle may have a same value as or similar values to that of angle B. For example, the turning angle and orientation angle may have a value that is within a preset range around the value of angle B. In the case described above, the turning angle and orientation angle may have the same value. In some other cases, the turning angle and orientation angle may have different values.

When it is detected that smartphone 58 is rotated clockwise around the Z axis by about 90 degrees, character 60 turns clockwise around the Z axis by about 90 degrees in the first turning mode at Step 2. If the second turning mode is enabled, the orientation of smartphone 58 is detected. As smartphone 58 becomes facing in the right direction, character 60 is turned and becomes facing in the right direction at Step 2. Hence, for both the first and second turning mode, the facing direction of character 60 on screen 62 may be controlled by the pointing direction of smartphone 58. For character 60, a facing direction may be a direction that the face of character 60 faces in when standing, sitting, or lying. As shown in FIG. 15, an arrow E may represent the facing direction of character 60. In similar manners to the control of facing direction of a graphic object, for a shooting video game, the direction that a gun aims in may also be controlled by the pointing direction of a device like smartphone 58.

When it is detected that smartphone 58 rotates clockwise around the Z axis axis, character 60 may be rotated clockwise around the Z axis accordingly as shown in FIG. 15, which may be referred to as the forward mode of the video game application. In some other embodiments, different mechanism may be arranged. For example, assume that character 60 faces in a direction out of the page. If a user rotates smartphone 58 to the right (i.e., clockwise) by angle B as shown in FIG. 14, the user may want character 60 turns to the right (i.e. anticlockwise) by angle B approximately, which may be referred to as the reverse mode. Optionally, a button with a label "Reverse Mode" may be configured on the screen of smartphone 58 (i.e., an interface of the video game application). After the button is activated, the reverse mode is turned on. In the reverse mode, when it is detected that smartphone 58 rotates clockwise around the Z axis, character 60 may be rotated anticlockwise around the Z axis in response. The reverse mode works for the first turning mode that relies on a clockwise or anticlockwise change of the device pointing direction. When both the reverse mode and the second turning mode are on, the facing direction of character 60 may be calculated with the forward mode and a reference image of character 60 may be obtained using the same method as illustrated above for the forward mode and second turning mode. Then, a mirror image of the reference image may be generated and presented on screen 62. In the mirror image, character 60 also turns in the opposite direction compared to the turning direction of smartphone 58.

Referring to FIG. 16, the moving object 70 is moving along a direction F on screen 68 at Step 1. Assume that a coordinate system with X, Y, and Z axes (not shown) is configured and remains fixed with respect to the background of moving object 70. The X axis may point to the right side, the Y axis may point to the top of screen 68, and the Z axis may point out the page. Also assume that moving object 70 is a vehicle 70 of a video game and screen 68 is a screen of a smartphone, e.g., smartphone 58 as shown in FIG. 14. A corresponding video game application is installed at smartphone 58. After a user starts the video game application, the movement, location, and orientation of smartphone 58 are monitored and detected.

For example, a control system of smartphone 58 may collect movement, location, and orientation data using sensors and send the data to the video game application, when the video game application is in operation. When it is detected that the pointing direction of smartphone 58 changes, e.g., smartphone 58 rotates clockwise around the Z axis, the video game application makes vehicle 70 take a turn clockwise accordingly. An arrow G in the figure represents a direction of motion of vehicle 70. For example, in response to that smartphone 58 is turned clockwise around the Z axis by angle B as shown in FIG. 14, vehicle 70 may make a turn clockwise around the Z axis on screen 68. The change of direction of motion may be based on angle B, which corresponds to the first turning mode illustrated above. Similarly, for the second turning mode, after it is detected that the pointing direction of smartphone 58 is changed, the direction of motion of vehicle 70 is adjusted based on the pointing direction of smartphone 58. If the pointing direction of smartphone 58 forms angle B with the Y axis in the X-Y plane, the direction of motion of vehicle 70 forms an angle based on angle B with the Y axis in the X-Y plane.

In the first and second turning mode as illustrated above, the angle which vehicle 70 turns or the angle which the direction of motion of vehicle 70 forms may approximately equal to angle B, or a value that is within a certain range around the value of angle B. In addition, buttons 64 and 66 as shown in FIG. 14 may be used to control the speed of vehicle 70. When button 64 is pushed or tapped, vehicle 70 is accelerated and its speed increases. When button 64 is pushed or tapped, vehicle 70 is decelerated and slows down.

Referring to Step 2 as shown in FIG. 16. Assume that the pointing direction of smartphone 58 is changed and the phone rotates clockwise around the Z axis by angle J. In the first turning mode, vehicle 70 may make a turn to the right (i.e., a clockwise turn), change the direction of motion to direction H, and move along direction H. The change of direction of motion may be approximately angle J, as depicted in FIG. 16. Alternatively, if the second turning mode is on, after it is detected that the pointing direction of smartphone 58 is changed, the direction of motion of vehicle 70 is adjusted based on the pointing direction of smartphone 58. As the pointing direction of smartphone 58 forms angle J with the Y axis in the X-Y plane, the direction of motion of vehicle 70 forms approximately angle J with the Y axis in the X-Y plane, as depicted in FIG. 16.

Hence, in both the first and second turning mode, the direction of motion of vehicle 70 on screen 68 may be controlled by the pointing direction of smartphone 58. To avoid changing the direction of motion abruptly, the video game application may make the adjustment gradually when a change of pointing direction is larger than a predetermined value. For example, when the pointing direction is changed by a turning angle that is larger than a preset value, the turning angle may be divided into small angles that include one or more predetermined angles with a predetermined small value, and the direction of motion of vehicle 70 may be changed by the small angles consecutively. That is, the direction of motion of vehicle 70 may be adjusted multiple times and changed a little each time to achieve a gradual and smooth process. The addition of the small angles equals to the turning angle.

When it is detected that smartphone 58 rotates clockwise around the Z axis, vehicle 70 may make a turn clockwise accordingly as shown in FIG. 16, which may be referred to as the forward mode of the video game application. In some other embodiments, different mechanism may be arranged to fit the needs of users. For example, assume that vehicle 70 moves in a direction that is the opposite of direction F on screen 68. If a user rotates smartphone 58 to the right (i.e., clockwise) by angle B as shown in FIG. 14, the user may want vehicle 70 turns to the right (i.e. anticlockwise) by angle B approximately, which may be referred to as the reverse mode. Optionally, a button with a label "Reverse Mode" may be configured on the screen of smartphone 58. Once the button is activated, the reverse mode is turned on. In the reverse mode, when it is detected that smartphone 58 rotates clockwise around the Z axis, vehicle 70 may make a turn anticlockwise around the Z axis in response.

Similarly to the embodiments regarding changing the facing direction, the reverse mode works for the first turning mode that relies on a clockwise or anticlockwise change of device pointing direction to change the direction of motion. On the other hand, when both the reverse mode and the second turning mode are on, the direction of motion of vehicle 70 may be calculated with the forward mode and a reference image of vehicle 70 may be obtained using the same method as illustrated above for the forward mode and second turning mode. Then, a mirror image of the reference image may be generated and presented on screen 68. In the mirror image, vehicle 70 turns in the opposite direction compared to the turning direction of smartphone 58. That is, when the pointing direction of smartphone 58 turns clockwise, the direction of motion of vehicle 70 turns anticlockwise.

In some cases, the moving object on screen 68 may also be a character, a robot, a boat, an airplane, etc. For vehicle 70, a direction of motion may be a direction that vehicle 70 moves in.

Referring to FIG. 14, when a user plays with smartphone 58, smartphone 58 may be tilted and its screen may not be in a horizontal plane. In such a case, the coordinate system may be tilted as smartphone 58 is. When smartphone 58 is tilted, smartphone 58 may become lying in a tilting plane that forms a tilting angle with the horizontal plane. Then, the coordinate system may be tiled by the tilting angle and the X-Y plane may superimpose the tilting plane. When it is detected that smartphone 58 turns clockwise or anticlockwise around the Z axis that is perpendicular to the X-Y plane, the change of pointing direction in the X-Y plane or the pointing direction in the X-Y plane may be utilized to change the facing direction or the direction of motion. That is, the change of pointing direction of smartphone 58 in a tilting plane may be used to change the facing direction or direction of motion in the same way as depicted above when smartphone 58 is in a horizontal plane. In some cases, the screen of smartphone 58 may be perpendicular to a horizontal plane. In such cases, the pointing direction of smartphone 58 may still be used to change the facing direction or direction of motion of an object in the same way or similar ways.

In some embodiments, the pointing direction of an electronic device (e.g., a smartphone, a video game console, or a controller device) may be used to control the orientation, facing direction, or direction of motion of an object in real life. The object in real life may include as a robot, a vehicle, a boat, or a flying object (e.g., an airplane or UAV), etc. For example, character 60 as shown in FIG. 15 may be a robot in real life. The pointing direction of an electronic device (e.g., smartphone 58 with reference to FIG. 14) may be used to control the facing direction of the robot in the same way as or a similar way to the embodiments illustrated above. The electronic device may be connected to the robot via a wireless network, Wi-Fi, or Bluetooth. In addition, the electronic device may have an antenna that may transmit control signals to the robot and the robot may have an antenna to receive the control signals.

As another example, vehicle 70 as shown in FIG. 16 may be a robot, a vehicle, a boat, or an UAV in real life. The pointing direction of an electronic device (e.g., smartphone 58 with reference to FIG. 14) may be used to control the direction of motion of the robot, vehicle, boat, or UAV in the same way as or a similar way to the embodiments illustrated above. Similarly, the direction of motion may be changed gradually with multiple small angles to avoid overturning or other unstable movements, when the change of the pointing direction is larger than a predetermined value. The value of the small angle may be determined based on the speed of the moving object.

Similar to the embodiments with respect to FIGS. 14-16, the forward mode, reverse mode, first turning mode, and second turning mode may be arranged for an application or program that controls an object in real life according to device pointing direction. For example, when the forward mode and the first turning mode are on, and it is detected that smartphone 58 (or a controller device) rotates clockwise around the Z axis, the object may be rotated clockwise around the Z axis or the direction of motion of the object may turn clockwise correspondingly. When the reverse mode and the second turning mode are on, and it is detected that the pointing direction of smartphone 58 (or a controller device) forms an angle with the Y axis in the X-Y plane, the facing direction of the object may form an angle with the Y-axis in the X-Y plane, where the facing direction is a mirror image of a direction obtained via the forward mode and the second turning mode. The reverse mode may be useful when the object faces a user who controls the object, or when the object moves toward a user who controls the object.

The embodiments illustrated above, including the first turning mode, second turning mode, forward mode, and reverse mode, may be used in a three-dimensional (3D) environment. For example, a change of device pointing direction may be in any plane in the 3D environment, and a device pointing direction may point at any direction or lie in any plane in the 3D environment. The change of device pointing direction or the device pointing direction may be used to determine the facing direction (or direction of motion) of an object that is located in another 3D environment.

As a flying object such as an UAV may rotate around three axes in flight (e.g., on screen or in real life), such as rotating around pitch, roll, or yaw axis, smartphone 58 (or a controller device) may be used to implement such maneuvers in an intuitive way. Smartphone 58 may rotate in a first coordinate system with X, Y, and Z axes. The UAV may fly in a second coordinate system with X, Y, and Z axes. The first and second coordinate systems may be viewed as parallel or virtually parallel to each other. For example, their X, Y, and Z axes may be parallel or virtually parallel, respectively. Referring to FIG. 14, let the X, Y, and Z axes of the first coordinate system (i.e., smartphone 58) correspond to the pitch, roll, and yaw axes of the UAV, respectively. Similar to embodiments illustrated above, one of the first and second turning modes and one of the forward and reverse modes may be combined to create a scenario and four scenarios may be arranged.

In the first scenario, the first turning mode and the forward mode are on (i.e., combined). When it is detected that smartphone 58 rotates clockwise around the X, Y, or Z axis of the first coordinate system, the UAV may be rotated clockwise around the pitch, roll, or yaw axis correspondingly. For example, in response to a clockwise rotation of smartphone 58 by a rotation angle around the X axis, the UAV may be rotated clockwise approximately by the rotation angle around the pitch axis. That is, the UAV may change in the same way as or similar way to that of smartphone 58.

In the second scenario, the first turning mode and the reverse mode are on. When it is detected that smartphone 58 rotates clockwise around the X, Y, or Z axis of the first coordinate system, the UAV may be rotated anticlockwise around the pitch, roll, or yaw axis correspondingly. For example, in response to a clockwise rotation of smartphone 58 by a rotation angle around the X axis, the UAV may be rotated anticlockwise approximately by the rotation angle around the pitch axis. That is, the UAV may change in a way that reflects a mirror image of that of smartphone 58. Similarly, when the pointing direction of smartphone 58 rotates clockwise, the direction of motion of the UAV rotates anticlockwise. The second scenario may be useful when the UAV flies toward a user.

In the third scenario, the second turning mode and the forward mode are on. When it is detected that the pointing direction of smartphone 58 forms a first angle with the X, Y, and/or Z axis of the first coordinate system, the direction of motion of the UAV may be changed to have a second angle with the X, Y, and/or Z axis of the second coordinate system correspondingly. The first and second angles may have the same value or similar values. For example, when the first angle is in a plane that forms a tilting angle with the X-Z plane of the first coordinate system, the second angle may be in a plane that forms the tilting angle with the X-Z plane of the second coordinate system. That is, the direction of motion of the UAV resembles or is similar to the pointing direction of smartphone 58.

In the fourth scenario, the second turning mode and the reverse mode are on. When it is detected that the pointing direction of smartphone 58 forms a first angle with the X, Y, and/or Z axis of the first coordinate system, the direction of motion of the UAV may be changed to have a second angle with the X, Y, and/or Z axis of the second coordinate system correspondingly. The first and second angles may have the same value or similar values. The second angle is arranged such that the direction of motion of the UAV is a mirror image of the pointing direction of smartphone 58. That is, when the pointing direction of smartphone 58 rotates clockwise, the direction of motion of the UAV rotates anticlockwise. The fourth scenario may be useful when the UAV flies toward a user.

In addition, two working modes may be provided for users. In the first working mode, the orientation and/or physical movement of a controlling device may cause a change of orientation and/or direction of motion of an object, which corresponds to what described above. In the second working mode, the orientation and/or physical movement of a controlling device may not cause any change of orientation and/or direction of motion of an object. For example, a "Pause" button (not shown) and a "Resume" button (not shown) may be configured on the screen of smartphone 58 with reference to FIG. 14. When button "Pause" is activated, the application or video game application may perform a pause act, stopping using the change of device pointing direction of smartphone 58 to adjust the facing direction or direction of motion of an object. The pause act may end when the "Resume" button is activated, and then a previous mode may return and any change of device pointing direct after activation of the "Resume" button may be detected and used to control an object, which may include any object that is arranged on screen or in real life as described above. As such, after the "Resume" button is activated, the reference pointing direction or orientation for the first turning mode is reset. For the first turning mode, any change of device pointing direction is measured against the reset reference pointing direction or orientation. As the second turning mode has no reference factors, a reset step is not needed.

The reset method applies to rotation controls around the pitch, roll, or yaw axis in similar ways. For example, after the "Pause" button is tapped, the control methods with respect to the three axes depicted above are disabled. Rotation of a controlling device (e.g., smartphone 58) may not be used to control a flying object. After the "Resume" button is tapped, if the first turning mode is resumed, the control methods with respect to the three axes depicted above are enabled, reference orientation and the pitch, roll, and yaw axes of the flying object are reset, and any rotational act of smartphone 58 after the resetting time may be used to control maneuvers of the flying object.

Optionally, after button "Pause" is activated, certain buttons may show up on the screen of smartphone 58 and the buttons may be used to control the facing direction or direction of motion of an object.

CONCLUSION, RAMIFICATIONS, AND SCOPE

Thus it can be seen that systems and methods are introduced to present map and other location-based information utilizing a device pointing direction.

The improved methods and systems have the following features and advantages:
(1). A map and other location-based info may be presented selectively according to a device pointing direction;
(2). An elongated map segment may be used as a directional mark to show a direction of a target;
(3). An elongated map segment may be used to show a place, an event, an object, or a person along a device pointing direction;
(4). An elongated map segment may be used to search a place, an event, an object, or a person along a device pointing direction;

(5). An arrow on a map may be used as a directional mark to show a direction of a target or search for a target; and (6). The change of device pointing direction may be used to adjust the facing direction or direction of motion of an object.

Although the description above contains many specificities, these should not be construed as limiting the scope of the invention but as merely providing illustrations of some of the presently preferred embodiments. Numerous modifications will be obvious to those skilled in the art.

Ramifications:

A device may be equipped with a facial recognition system. The system may at least recognize the device owner, which may protect user privacy by not following other people's instructions. For instance, when a user uses a pointing mode or an arrow mode to find a friend or a family member, it may be designed that the user's identity is verified first to avoid privacy leak or safety concerns. With facial recognition or other suitable identification techniques, a user's identify may be confirmed automatically. The system may make use of eye-tracking camera and employ facial sensing algorithm for identification process.

Besides smart glasses, a user may also speak to other portable or wearable devices (e.g., a smartphone or smart watch) to turn on a pointing mode or an arrow mode using voice recognition techniques. For instance, a user may utter to a device "pointing" to start a pointing mode, whether a map app is on or is not on. To avoid triggering pointing mode accidentally, gazing direction may be arranged as the other condition. For instance, a user may say "pointing" and then look at the device to invoke a pointing mode.

If a user's identity is known, info may be selected not only based on the location of the user, but also his or her past experience. For instance, when a user is in a store, his or her past purchasing data may be used for selecting the best-fit ads and info for the user.

In real life, when a user holds a device, especially when a user is walking, the device may not be held steadily. The device may be in a shaking situation. With motion sensor like sensor 18 of FIG. 1, the movement pattern may be detected and identified as an unintentional shake act. Once it is determined a device is in an unintentional shake situation, pointing direction may not be adjusted constantly even when small changes are measured. Excluding constant changes caused by unintended maneuver makes a presentation simple, stable, and more effective.

The two aforementioned types of directional mark, map segment and arrow, may be combined. For instance, a screen may show a map segment with a directional arrow going from a user location to a target location. At the beginning, a map segment and an arrow may point to different directions. Eventually, they may be aligned by a user. Thus a device, a map segment, and an arrow may all point to the same target, constructing a clear directional guidance.

As described above, a user may rotate a device to scan surrounding places and get different map segments and info along different directions. Alternatively, a scan performed by a virtual rotation process may be designed, during which a device may remain still and experience no rotational movement. After a virtual rotation process begins, a map segment may rotate on screen, while the device doesn't rotate. The rotating segment may show part of map along a direction which the segment points at each time. A user may specify how many map segments to be presented in total during a scanning process. For information search besides places, other on-screen object, like an arrow-shaped symbol, may replace a map segment to do the animated rotating act. A virtual rotation scheme may help when it's not convenient to rotate a device. Additionally, it may be designed that a user may rotate a map segment manually. For instance, an elongated map segment may be aligned to a device pointing direction initially. If a user wants the segment to point to another direction, say forty-five degrees to the right, the user may use one or more fingers to touch the segment image on a touch screen, and then rotate the image like rotating a real object until the segment points along a forty-five degree angle. Then content items corresponding to the new direction may be presented on screen.

Lastly, when a user is on the way to approach a target place, an object, or a person, he or she may launch a pointing app or start a pointing mode. As it may take some time to get there, a device display may be turned off automatically to conserve power after certain time of inactivity. Then for convenience, the eye-tracking technology may be used to turn on the display when the user wants to view it. For instance, a display screen may be lightened up once it is detected that a user gazes at it. A user may gaze at it to turn on the screen and then take a look at an updated map or map segment and learn how close a target has become. On the other hand, it may be designed that shaking or knocking on a device also turns on a screen when a pointing or arrow mode is on. For instance, a user may open a pointing app at a phone to check a target location. After the phone screen enters standby mode, the user may shake or knock the phone lightly to lighten up the screen and view the target location one more time. A knocking act, which causes device shaking and vibrating, may be detected by a sensor like sensor 18 of FIG. 1.

Therefore the scope of the invention should be determined by the appended claims and their legal equivalents, rather than by the examples given.

The invention claimed is:

1. A method performed for changing a facing direction of a graphic object presented on a display, comprising:
   1) detecting a pointing direction of an electronic device when an application or program is in operation at the electronic device, wherein the pointing direction of the electronic device is adjustable by a user; and
   2) in response to detecting that the pointing direction of the electronic device changes clockwise from a first direction to a second direction and the second direction corresponds to a first angle with respect to a first coordinate system, changing the facing direction of the graphic object presented on the display clockwise from a previous direction to a first adjusted direction when a first mode is on, and changing the facing direction of the graphic object presented on the display anticlockwise from the previous direction to a second adjusted direction when a second mode is on, wherein the first and second adjusted directions correspond to a second angle with respect to a second coordinate system, the first angle and the second angle have a same value or similar values, and the graphic object faces in the facing direction on the display.

2. The method according to claim 1 wherein the graphic object is in motion on the display.

3. The method according to claim 1 wherein the graphic object stays at a location on the display.

4. The method according to claim 1 wherein the electronic device includes the display.

5. The method according to claim 1, further including providing an option for the user to turn on the second mode.

6. The method according to claim 1, further including in response to detecting that the pointing direction of the electronic device rotates clockwise, rotating the facing direction of the graphic object clockwise when the first mode is on.

7. The method according to claim 1, further including in response to detecting that the pointing direction of the electronic device rotates clockwise, rotating the facing direction of the graphic object anticlockwise when the second mode is on.

8. A method performed for changing a direction of motion of a graphic object presented on a display, comprising:
   1) detecting a pointing direction of an electronic device when an application or program is in operation at the electronic device, wherein the pointing direction of the electronic device is adjustable by a user; and
   2) in response to detecting that the pointing direction of the electronic device changes clockwise from a first direction to a second direction and the second direction corresponds to a first angle with respect to a first coordinate system, changing the direction of motion of the graphic object on the display clockwise from a previous direction to a first adjusted direction when a first mode is on, and changing the direction of motion of the graphic object on the display anticlockwise from the previous direction to a second adjusted direction when a second mode is on, wherein the first and second adjusted directions correspond to a second angle with respect to a second coordinate system, the first angle and the second angle have a same value or similar values, and the graphic object moves along the direction of motion on the display.

9. The method according to claim 8, further including providing an option for the user to turn on the second mode.

10. The method according to claim 8, further including adjusting the direction of motion of the graphic object by a predetermined angle when a difference between the first direction and the second direction is larger than a predetermined value.

11. The method according to claim 10, further including after detecting a first act of the user, stopping changing the direction of motion of the graphic object in response to a change of the pointing direction of the electronic device, and after detecting a subsequent second act of the user, changing the direction of motion of the graphic object in response to a change of the pointing direction of the electronic device.

12. The method according to claim 8 wherein the electronic device includes the display.

13. The method according to claim 8, further including in response to detecting that the pointing direction of the electronic device rotates clockwise, rotating the direction of motion of the graphic object clockwise when the first mode is on.

14. The method according to claim 8, further including in response to detecting that the pointing direction of the electronic device rotates clockwise, rotating the direction of motion of the graphic object anticlockwise when the second mode is on.

15. An electronic device comprising: a processor; and a memory device coupled to the processor, the processor configured to:
   1) detect a pointing direction of the electronic device when an application or program is in operation at the electronic device, wherein the pointing direction of the electronic device is adjustable by a user; and
   2) in response to detecting that the pointing direction of the electronic device changes clockwise from a first direction to a second direction and the second direction corresponds to a first angle with respect to a first coordinate system, change a facing direction of a graphic object presented on a display clockwise from a previous direction to a first adjusted direction when a first mode is on, and change the facing direction of the graphic object presented on the display anticlockwise from the previous direction to a second adjusted direction when a second mode is on, wherein the first and second adjusted directions correspond to a second angle with respect to a second coordinate system, the first angle and the second angle have a same value or similar values, and the graphic object faces in the facing direction on the display.

16. The electronic device according to claim 15 wherein the graphic object is in motion on the display.

17. The electronic device according to claim 15 wherein the electronic device includes the display.

18. The electronic device according to claim 15 wherein the processor is further configured to provide an option for the user to turn on the second mode.

19. The electronic device according to claim 15 wherein the processor is further configured to in response to detecting that the pointing direction of the electronic device rotates clockwise, rotate the facing direction of the graphic object clockwise when the first mode is on.

20. The electronic device according to claim 15 wherein the processor is further configured to in response to detecting that the pointing direction of the electronic device rotates clockwise, rotate the facing direction of the graphic object anticlockwise when the second mode is on.

* * * * *